United States Patent

[11] 3,591,209

| [72] | Inventor | Wilhelm Knechtel<br>Rodheim-Bieber, Germany |
|---|---|---|
| [21] | Appl. No. | 32,174 |
| [22] | Filed | Apr. 27, 1970 |
| [45] | Patented | July 6, 1971 |
| [73] | Assignee | ECE-Elektrostatik und Chemische<br>Entwicklungsgesellschaft mbH<br>Giessen, Germany |
| [32] | Priority | Apr. 26, 1969 |
| [33] | | Germany |
| [31] | | P 19 21 490.5 |

[54] DEVICE FOR CONNECTING SHEET ELEMENTS AT RIGHT ANGLES TO EACH OTHER
6 Claims, 3 Drawing Figs.

[52] U.S. Cl. .................................................... 287/20.92, 287/54
[51] Int. Cl. .................................................... F16b 5/00
[50] Field of Search ............................................ 287/20.926, 20.927, 20.92 D, 189.36 H, 54 C

[56] References Cited
UNITED STATES PATENTS

| 2,624,386 | 1/1953 | Russell | 287/20.92 D |
| 3,363,922 | 1/1968 | Anderson | 287/189.36 H |

*Primary Examiner*—Reinaldo P. Machado
*Assistant Examiner*—Andrew V. Kundrat
*Attorney*—Edmund M. Jaskiewicz ABSTRACT: A pin having a transverse threaded bore therethrough passes through an opening in a sheet element and a screw passing through an opening in a second sheet element at right angles to the first element is threadedly received within the pin bore. The threaded bore is spaced from the head of the pin a distance corresponding to the thickness of the sheet element through which the pin passes so that the entire length of the screw is positioned against a face of the pin-carrying sheet element.

PATENTED JUL 6 1971 3,591,209

INVENTOR
WILHELM KNECHTEL

BY *Edmund M Jaskiewicz*
ATTORNEY

DEVICE FOR CONNECTING SHEET ELEMENTS AT RIGHT ANGLES TO EACH OTHER

The present invention relates to connectors for sheet elements, more particularly, to a device for connecting sheet elements at right angles to each other.

Many forms of connectors have been devised to fasten sheet elements together at right angles to each other. In one such form a curved angle member has its legs respectively secured, such as with screws, to sheet elements positioned at right angles to each other. This connector thus comprises three elements, namely, the angle member and at least two bolts or screws. Such a connection is relatively expensive and utilizes a relatively large quantity of material, particularly in the angle member. A further disadvantage is that considerable skill is required in assembling such a connection since the angle member is initially positioned loosely between the sheet elements which are to be connected.

Another form of such a connector includes the use of an angle member with one leg of the angle being attached to one sheet element and the other leg to the other sheet element However, this connector has the disadvantage since the bending of the angle is time consuming since the bend must be accurately made. The accuracy of the bend is particularly vital when a single sheet is to be fastened at right angles to other sheets which are parallel to each other. This means that two angles must be used and both angles must be bent extremely accurately so that when the legs of the respective angles are secured to the sheet elements the distance between the parallel sheet elements will not be varied.

In an attempt to overcome the disadvantages of the above-described connectors it was proposed to construct a connector having the form of a nut with a flattened right-angle head. A hole was formed in one of the sheet elements to be connected and the nut with its head inserted through that hole. An opening was then punched in the other sheet element and a screw passed therethrough to be threaded into the flattened nut. This type of connector together with its assembly was rather expensive since the punching or perforating operations required for the sheet elements are costly and the specialized shape of the nut head significantly increased the cost of the connector.

In another form of connector a slot was formed in a sheet element and an angle inserted through that slot in such a manner that one leg was fastened to that sheet element and the other leg was positioned parallel to the second sheet element which was to be connected. A screw was then threaded into a serrated thread positioned in a leg of the angle to form the connection. However, this connector was disadvantageous in that it was necessary to punch or otherwise cut a slot in a sheet element and the particular angle connector was relatively expensive to fabricate.

All of the proposed connections for sheet elements at right angles to each other as described above were characterized as being rather expensive to manufacture as well as being expensive to assemble.

It is therefore the principal object of the present invention to provide a novel and improved device for connecting sheet elements at right angles to each other.

It is another object of the present invention to provide such a connector which is simple and inexpensive to fabricate and permits connection between the two sheet elements with a minimum of time and effort.

According to one aspect of the present invention a device for connecting sheet elements at right angles to each other may comprise a pin having a transverse threaded bore therethrough inserted through a hole in one sheet element. A screw is inserted through a hole in another sheet element positioned at right angles to the first sheet element and the screw is threaded into the transverse bore of the pin. Both the pin and the screw are provided with heads which bear against the outer surfaces of the connected sheet metal elements and serve to retain the pin and screw in position The threaded bore in the pin may be positioned from the head of the pin a distance substantially equal to the thickness of the sheet element through which the pin is inserted. The screw which is then passed through the second sheet element has its entire length contacting a face of the first sheet element.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
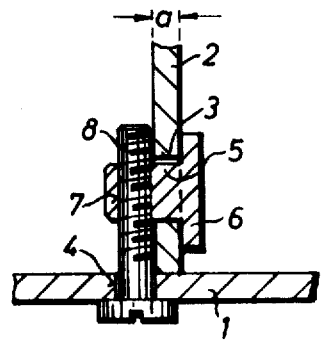
FIG. 1 is a transverse sectional view through two sheet elements connected according to the present invention and showing the components of the connector in position.
Figure 2:
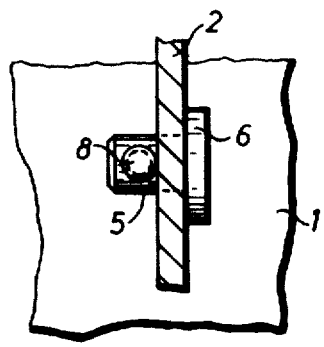
FIG. 2 is a top plan view of the connection illustrated in FIG. 1 with one sheet element being shown in section.

As may be seen in FIGS. 1 and 2, a sheet or flat element 1 is to be connected with a sheet or flat element 2 in such a manner that the sheet 2 is positioned vertically upright with respect to sheet 1 as viewed in the drawings. A hole 3 is bored in sheet 2 and a hole 4 bored in sheet 1 A pin 5 having a head 6 is inserted through the hole 3 so that the head 6 is flush with a surface of sheet 2. The diameter of the hole 3 is substantially equal to the diameter of the pin 5.

The pin 5 is provided with a threaded bore 7 extending transversely through its shank.

A screw 8 also having a head is inserted through opening 4 and screwed into the threaded bore 7. The screw 8 is similarly positioned so that its head rests flat upon a surface of the sheet element 1. The diameter of the hole 4 in sheet element 1 is substantially equal to the diameter of the screw 8.

The threaded bore 7 is so spaced from the head 6 of the pin that the distance between the head and bore is substantially equal to the thickness of the sheet element 2 indicated at a. With this construction the entire length of the screw 8 rests against a surface of the sheet element 2 so that bending of the sheet element 2 is considerably minimized when the screw 8 is being tightened. As a result, there is no deformation in the sheet 2 where the connection is being made The connection will remain at right angles even though some bending forces may be encountered due to the tightening of screw 8 but the sheet elements will not be deformed.

As may be seen in the drawings, both the threaded bore and the head of the pin are transverse to the axis of the pin.

Figure 3:
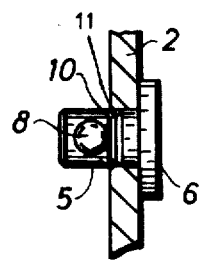
FIG. 3 is a view similar to that of FIG. 2 but showing a modification in the connector.

In FIG. 3 there is shown a modification wherein the pin 5 is provided with an annular notch 10 into which is pressed the burr or flash 11 on the sheet resulting from boring of the hole 3. This provides an additional locking or safety feature for the connection The connection according to the present invention may be employed for sheet elements of metal, plastic wood or other materials. The screw and pin may also be formed of suitable metals, plastics, or other materials, depending upon the particular application.

The connector device according to the present invention is particularly advantageous for use in connecting sheet elements in prototypes or models of an assembly. In these applications it is frequently desired to disconnect or loosen the connection in order to modify or change the dimensions of the sheets. The connector device according to the present invention permits this flexibility of the connection. The connector device is also useful in connecting samples or a series of small pieces onto a base or sheet member.

A further example of an application of the connector device according to the present invention is in the construction of assemblies according to a modular or building block principle.

Thus it can be seen that the present invention has disclosed a simple but effective device for connecting sheet elements at right angles to each other The device comprises two fastener elements which are interconnected and form a rigid and secure connection between the sheet elements The connector device may be used with various materials It is understood that this invention is susceptible to modification in order to adapt it to different usages and conditions and, accordingly, it is desired to comprehend such modifications within the invention as may fall within the scope of the appended claims

What I claim is:

1. A device for connecting sheet elements at right angles to each other and comprising a pin having a threaded bore therethrough and transversely of the pin axis, and a screw threadedly received within said pin bore said pin has an enlarged head, the threaded bore being spaced from said head a distance substantially equal to the thickness of a sheet element which is to be connected 2. A device as claimed in claim 1 wherein said screw has a head.

3. A device as claimed in claim 1 wherein said pin and screw each has a circular cross section 4. A device as claimed in claim 1 wherein there is an annular notch in said pin spaced from the head thereof 5. A device as claimed in claim 1 wherein the head of said pin is also transverse thereof.

6. A device as claimed in claim 1 wherein a first sheet has an opening through which passes said pin, a second sheet at right angles to said first sheet has an opening through which passes said screw, said screw being threaded into said pin-threaded bore so that the sheet elements are secured at right angles to each other.